United States Patent Office 3,115,521
Patented Dec. 24, 1963

3,115,521
AROMATIC ACID PURIFICATION
Edward A. Swakon, Hammond, Ind., assignor to Standard Oil Company, Chicago, Ill., a corporation of Indiana
No Drawing. Filed Apr. 29, 1960, Ser. No. 25,532
11 Claims. (Cl. 260—525)

This invention relates to the purification of aromatic polycarboxylic acids and more specifically pertains to the purification of isophthalic and terephthalic acids resulting in products of exceptionally low metals content suitable for conversion to esters, polyamides and polyesters which are useful in the preparation of fiber and film-forming polymeric derivatives of terephthalic acid.

Aromatic polycarboxylic acids to be suitable for use in the preparation of highly pure alkanol and polyol esters and polyamides for fiber and film-forming derivatives must be of an exceptionally high purity. They should be substantially free from dark-colored impurities as to be white or slightly off-white. This high requirement on color has been found to be essential because of the subsequent reactions and heat history encountered in the formation of polymeric materials. Dark-colored impurities and impurities which impart dark colors to the polymeric derivatives of aromatic polycarboxylic acids are undesirable. Also undesirable in the aromatic polycarboxylic acids are organic impurities which are by-products of the oxidation reactions utilized in the preparation of said aromatic acids. Such impurities are, in general, products intermediate to the starting material and the aromatic polycarboxylic acid products. In general, these intermediates possess such similar properties as solubility, boiling point, etc. that they are not completely removed from the aromatic acid product by the usual means of recovery from the reaction mixture, and, furthermore, they are not readily removable from the aromatic acid product by conventional separation methods. These organic impurities may in some instances be chain terminators or in some other way interfere with the reactions involved in the preparation of polymeric materials from the aromatic polycarboxylic acids. Also, such impurities react to form low melting products and/or products which lower the melting point of the aromatic derivatives of the polycarboxylic acids.

One commercial method for obtaining terephthalic acid of sufficient purity for the preparation of fiber and film-forming polyesters of terephthalic acid is to react terephthalic acid with a lower alkanol to form a dialkyl terephthalate, preferably dimethyl terephthalate. The resulting diester has a boiling point appreciably below that of terephthalic acid and can, therefore, be readily distilled to purify the diester. The purified diester is then reacted with a polyol under transesterification conditions to form the corresponding diesters. The diester is then subjected to a polycondensation reaction to form the high molecular weight polyester. Obviously, such a process for the purification of terephthalic acid involves such added steps as esterification, ester purification and transesterification which are not only costly but appreciably complicate the preparation of the desired end product. Direct reaction of aromatic polycarboxylic acids such as terephthalic acid with a polyol such as ethylene glycol has been known, but the resulting esters produce only dark polyesters of such low melting point as to be unsatisfactory for fiber and film preparation. There is, therefore, a need for a commercially feasible process for preparing aromatic polycarboxylic acids and especially terephthalic acid of sufficiently high purity to be useful in the direct formation of intermediates used in the preparation of fiber and film-forming polymeric materials.

Several excellent processes have been discovered by my contemporary fellow researchers for removing organic impurities, color-forming and colored impurities from aromatic carboxylic acids. These processes are, in general, high temperature and pressure water leaching of terephthalic acid; treatment of aqueous solutions of water-soluble salts of isophthalic and terephthalic acids by passing the solutions through a bed of activated charcoal; alkaline oxidation with a hypohalite or permanganate of aqueous solutions of water-soluble salts of isophthalic or terephthalic acid before or after treating said solutions in an activated charcoal bed; and a treatment of the aqueous solution of water-soluble salts of isophthalic or terephthalic acids with sodium hypohalite, crystallization from the treated solution by salting out and redissolving the crystallized isophthalic or terephthalic acid salt in water.

Aromatic carboxylic acids are sufficiently strong to attack metal surfaces which they contact in solution to pick up a relatively substantial amount of metals. When these aromatic carboxylic acids have been prepared by catalytic liquid phase oxidation processes in the presence of heavy metal oxidation catalysts, these catalyst metals are associated with the aromatic acid products. Also, when the aromatic acids are prepared by catalytic liquid phase oxidation in the presence of acetic acid or other lower aliphatic monocarboxylic acids as reaction solvents, there is associated with the aromatic acid products an appreciable amount of metals due to the attack of metal reaction equipment by the acid solvents. Representative of the metals which are associated with the aromatic acid products are cobalt, manganese, iron, nickel, chromium, vanadium, copper, aluminum, silicon and sodium, among others. The heavy metals are present both from the oxidation catalyst and from the acidic attack of metal apparatus in which the aromatic acids were prepared and/or recovered. The non-heavy metals are, of course, picked up from reactants, glass flow meters, pipes, etc. as well as from the acidic reaction solvent. The heavy metals form high melting, quite insoluble salts with the aromatic acids and are difficult to remove. They have an uncontrolled effect, because varying amounts of them may be present from time to time, on the preparation of ester and amide derivatives of the aromatic carboxylic acids.

There has now been discovered a process for the purification of aromatic carboxylic acids, especially with respect to the removal of heavy metals therefrom, which is readily adaptable for commercial operation whereby crude aromatic carboxylic acids of 95% or above purity can be converted to substantially metal free products. The process of this invention involves treating an aqueous solution of an alkaline salt of an aromatic carboxylic acid with carbon monoxide under pressure. A precipitate forms which apparently contains substantially all of the metals, at least the heavy metals and substantially all of the colored material. This precipitate, usually a colored precipitate, can be readily removed and the much lighter colored solution further treated with activated carbon to substantially remove the remaining colored impurities and the color-forming materials. Aromatic acid can be recovered from its salt in the purified solutions by springing with an inorganic acid or acid anhydrides.

The aqueous solution to be treated with carbon monoxide can be the water-soluble alkaline salts such as the water-soluble ammonium, sodium or potassium salts. As used herein the term "alkaline salts" is intended to include the water-soluble ammonium, sodium and potassium salts.

The process of this invention is advantageous for the purification of benzoic acid, terephthalic acid, isophthalic acid, trimellitic acid, trimesic acid, naphthalic acids, chlorophthalic acids, di(p-carboxyphenyl) methane, pyromellitic acid and the like, especially when produced by liquid phase oxidation with molecular oxygen-containing gas in the presence of a heavy metal oxidation catalyst.

It is preferred to carry out the carbon monoxide treatment of the aqueous solution of the alkaline salt at temperatures above 20° C., desirably at temperatures in the range of 20 to 200° C. and preferably at temperatures of from 100° to 200° C. at carbon monoxide pressures in the range of from 1 to 1000 atmospheres, preferably 10 to 100 atmospheres. It has been found that under these conditions a very small amount of carbon monoxide is consumed. By this treatment the metals content of the recovered aromatic acid is greatly reduced and the color of the recovered aromatic acid is greatly lowered. Carbon monoxide per se can be employed as well as gaseous mixtures containing 10% or more carbon monoxide such as in mixtures of CO and $H_2$ and CO and $N_2$, among others, as long as there is not sufficient acid forming materials to precipitate free aromatic acid from the solution of its salt.

To even further improve the color of the aromatic acid, the aqueous solution, after treatment with carbon monoxide, is passed through a bed of activated carbon.

The treatment with activated carbon is carried out at temperatures of from 20° C. up to 100° C. or above. The use of temperatures of 100° C. and above will, of course, require the use of superatmospheric pressure in carrying out this step of the process. The use of temperatures of 100° C. and above and superatmospheric pressure is a matter of choice. Even at temperatures below 100° C. the carbon treating step can be carried out at pressures of say up to 25 p.s.i.g.

Treatment of aqueous solutions of water-soluble alkaline salts of aromatic carboxylic acids with activated carbon requires that the pH of the solutions be adjusted to not above a value of 7 before contacting the solutions with activated carbon. For example, when treating solutions of alkaline salts of terephthalic acid with activated carbon, it is desirable that the pH of said solutions be in the range of about 5.5 to about 7 and it is preferred that the pH be in the range of from about 6 to 6.5. By first treating the aqueous solutions of the water-soluble alkaline salts with carbon monoxide, the pH of the resulting aqueous solution will advantageously be within the desired range for the subsequent treatment with activated carbon.

In both the carbon monoxide and activated carbon treatment the aqueous solution can be of the same concentration with respect to the dissolved salts. However, under some circumstances it will be found desirable to treat with carbon monoxide solutions which are of a higher concentration than those passed through the carbon bed, since the carbon monoxide treating step is carried out at elevated temperatures and pressure, both of which enhance the solubility of the salts of the acids being treated. In general, the solutions to be treated should contain from 25 to about 100% of the saturation concentration of the salts at the temperature of treatment, desirably 40 to 100° and preferably from 50 to 95% of saturation.

The quantity of activated carbon employed in the process of this invention will vary not only with the efficiency of the activated carbon but also with the concentration of the salt solution employed, the amount of impurities present and the time of contact. In general, the amount of activated carbon employed will be in the range of from 2 to 200 or more parts per part by weight of the acid being treated. Contact time in the range of from 1 to 60 minutes will provide sufficient activated carbon treatment to obtain the objectives of this step. Exceptionally useful activated carbons or charcoals include those obtained from carbonized paper pulp wastes, from such natural products as wood and coconut as well as carbon blacks such as the gas blacks. It is preferred for the commercial application of this invention to use activated carbons in a granular form to prepare beds of sufficient free path so as to provide a minimum of pressure drop through the bed. Specific activating carbons are the Cenco activated carbons, especially C-1543, products of Central Scientific Company; the Nuchar activated carbons, the products of West Virginia Pulp and Paper Company, such as C-145-A, C-1000-H, C-A, C-190-N, WA, C-115-A, C-1000-A, C-145-N, C-115-N, CEE-A, KPC, C-N, KD-2, KD, C-190 and C-190-A; and Darco activated carbons, a product of Darco Division of Atlas Powder Company, such as G-60. Such activated carbons are currently commercial products.

To recover the aromatic polycarboxylic acids from the carbon treated solution one may acidify the solution to spring the aromatic carboxylic acid. For this purpose the mineral acids such as sulfuric acid and hydrochloric acid, which are the preferred mineral acids, sulfurous acid or sulfur dioxide and carbonic acid or carbon dioxide may be employed. Another method for regenerating the aromatic polycarboxylic acids from the activated carbon treated solution involves crystallizing the salt of the aromatic carboxylic acid from solution, for example, by evaporative cooling or by salting out with a highly ionizable salt, preferably a highly ionizable salt whose cation corresponds to that employed in forming the water-soluble salt. Crystallization by evaporative cooling is preferably carried out with the aqueous solution of the ammonium salt. The crystallized ammonium salt is then heated to decompose the ammonium salt and regenerate the acid.

The detailed description of the process of the present invention is illustrated by the following examples. In these examples there is also described the removal of organic impurities. The resulting purified product is exemplified by an evaluation of its color which is reported as "TEG color." This color evaluation is made by preparting the product of the reaction of 4 grams of aromatic carboxylic acid and 28.5 ml. triethylene glycol at 500° F. with nitrogen purge. The liquid reaction product is cooled to room temperature, diluted with isopropyl alcohol 1:1 and the color of the dilute solution is compared with APHA (Hagen platinum-cobalt colors) standards with a Fisher electrophotometer using a $650\mu$ red filter and a $425\mu$ blue filter. The "TEG color" is, therefore, an APHA color. Acceptable high purity terephthalic acid, for example, should have a "TEG color" of less than 150, desirably less than 100 and preferably 60 or less.

*Example I*

A crude terephthalic acid to be purified by the process of this invention has a TEG color of about 1100, a 4-carboxybenzaldehyde content of about 1.55% and a metals content of about 200 p.p.m. The crude terephthalic acid is put into solution by combining one part by weight of sodium hydroxide for each two parts by weight crude terephthalic acid and 24 parts by weight of water in an autoclave. The autoclave is closed, charged with 775 p.s.i.g. carbon monoxide and the mixture therein heated to 180° C. for two hours. Thereafter the solution is cooled to room temperature, carbon monoxide is removed from the autoclave and the resulting aqueous mixture is filtered to remove a yellow-orange solid formed during the carbon monoxide treatment. The yellow-orange solid amounts to 0.05 part per part of crude terephthalic acid treated. A sample of the carbon monoxide treated solution is acidified to spring the terephthalic acid. Terephthalic acid purified in this manner will be found to have a metals content of 10 p.p.m. or less, a 4-carboxybenzaldehyde content of less than 0.05%, and an improved TEG color of less than one-half of that of the crude starting product.

The pH of the disodium terephthalate solution changes from 11 before treatment with carbon monoxide to 6 after treatment. The solution color changes from a yellow-orange before carbon monoxide treatment to water-white after carbon monoxide treatment. The remainder of the filtered aqueous solution of sodium terephthalate is passed through a carbon bed at a contact time of 0.5 hour at a ratio of activated carbon to terephthalic acid equivalent in solution of 5 to 1. The aqueous solution after treatment with activated carbon is acidified to a pH of 2 with sulfuric acid to spring terephthalic acid. The precipitated terephthalic acid is recovered by filtration, water washed and dried.

The purified terephthalic acid produced by the above-described process has a TEG color of 50.

Substantially equivalent results to that obtained by the process of Example I are also obtainable when an aqueous solution of dipotassium or diammonium terephthalate is treated with carbon monoxide in the manner described in Example I.

Example II

This example will illustrate the particular benefits obtained by the essential step of the process of this invention comprising treating the aqueous solution of the alkaline salt of the aromatic acid to be purified with carbon monoxide.

A mixture containing 7.5 grams of sodium hydroxide, 150 grams of distilled water and 15 grams terephthalic acid is heated at 380° F. under a carbon monoxide pressure of 500 p.s.i.g. The mixture when combined formed a solution which is amber before treatment with carbon monoxide. After treatment with carbon monoxide, the solution is substantially water-white and contains the salmon pink precipitate. The treated solution is filtered and about 1 gram of salmon pink solids is collected. The substantially water-white filtrate is neutralized with dilute sulfuric acid (15% $H_2SO_4$) forming a pasty mixture. This pasty mixture is stirred for about 30 minutes and then filtered to recover the regenerated terephthalic acid. The terephthalic acid filter cake is washed with hot and cold water and is then dried. The dried product is white. The following inspection data comparing the crude starting terephthalic acid and the recovered treated terephthalic acid are shown in the table below.

| Terephthalic Acid | TEGA Test APHA Color | Percent 4-Carboxy-benzaldehyde | Metals, p.p.m. | | | | | | | | | |
|---|---|---|---|---|---|---|---|---|---|---|---|---|
| | | | Ca | Cr | Fe | Pb | Mn | Mo | Ni | Na | Si | Al |
| Original crude acid | 740 | 1.92 | 5 | 3 | 4 | 2 | 3 | 2 | 2 | <12 | | |
| After CO-Treatment | 470 | 0.04 | | | 1.4 | <1 | <1 | | <1 | | <1 | <1 |

Since the treatment with carbon monoxide is carried out at elevated temperature and pressure, more concentrated solutions of the alkaline terephthalate salts can be employed than that described in Examples I and II. For example, an aqueous solution of disodium terephthalate prepared by combining for each two parts by weight of terephthalic acid one part of sodium hydroxide by weight and 10 parts of water by weight can be treated with carbon monoxide at 180° C. at 775 p.s.i.g. carbon monoxide pressure and the resulting mixture diluted with water as the carbon monoxide is being removed from the reaction vessel. In this manner a more dilute solution; e.g., in the range of 4 to 8% by weight of the disodium terephthalate, can be obtained for the treatment with activated carbon. At the same time the temperature of the aqueous solution can be decreased to that desired for the activated carbon treatment. When the carbon monoxide treating step is carried out with concentrated aqueous solutions of the alkaline terephthalates, the solutions after this treatment must be diluted to keep the salts in solution, since at 25° C. the solubilities are:

Potassium terephthalate _____ 23.6
Sodium terephthalate _____ 12.8
Ammonium terephthalate _____ 10.6

The above values are parts by weight of the salt per 100 parts by weight of the solution. The solubilities of these salts increase very slightly up to 100° C.; for example, sodium terephthalate is soluble to the extent of about 14.2 grams per 100 grams of solution. The solubility is, of course, much greater at temperatures above 100° C. at elevated pressure.

Example III

A crude isophthalic acid containing about 2% 3-carboxybenzaldehyde, having a TEG color of about 850 and a heavy metals content (mainly Fe and Cr) of 75 to 80 p.p.m. is substituted for the crude terephthalic acid employed in the process of Example I. By this process an isophthalic acid may be obtained having a metals content of 10 p.p.m. or less and an acceptable low color and low carboxybenzaldehyde content.

Example IV

A crude benzoic acid is obtained by the catalytic liquid phase oxidation of toluene with air in the presence of manganese and cobalt acetates. The heavy metals content (mainly Fe, Mn, Ni, Co, Cr, Cu and Ti) of such crude benzoic acid is in the range of 170 to 270 p.p.m. A saturated solution of the potassium salt of such a crude benzoic acid is prepared at 100° C. This solution is treated at a carbon monoxide pressure of 300 p.s.i.g. at 120° C. in an autoclave with stirring. The resulting solution is removed from the autoclave and is substantially water-white containing a colored precipitate. The solution is separated from the precipitate by filtration. The heavy metals content of the benzoic acid sprung from a portion of the filtered solution will be at least 10 p.p.m. The remainder of the filtered solution may be evaporated to recover dry potassium benzoate of low heavy metals content or may be also acidified to spring benzoic acid which can be recovered by a combination of crystallization and solution concentration.

The process of this invention can be employed to remove colored impurities and heavy metals from terephthalic acid produced by the isomerization and disproportionation of ortho- and meta-phthalic acids and benzoic acid as their potassium salts in the presence of carbon dioxide and certain catalysts such as zinc and cadmium. The resulting dipotassium terephthalate is dissolved in water to form a 23% solution of the dipotassium salt, treated with carbon monoxide at 600 p.s.i.g. at 125° C. and filtered to remove the resulting colored precipitate. Terephthalic acid of low metals content can be regenerated by acidifying the filtered solution.

Example V

A crude trimellitic acid having a heavy metals content (mainly Mn and Co) of about 0.6 percent by weight is taken up with water as its water-soluble triammonium salt to form a 15% solution of the triammonium salt. This solution is charged to an autoclave, the autoclave is closed, charged with carbon monoxide to 600 p.s.i.g. and heated to 150° C. for two hours. Thereafter the solution is cooled to room temperature, the carbon monoxide is vented and the resulting substantially water-white solution is filtered to remove the colored precipitate formed during the treatment with carbon monoxide. Upon acidification of the water-white solution, trimellitic acid is reformed as a precipitate. Trimellitic acid purified in this manner will have a low metals content.

The process of this invention can also be employed to purify tetrachloro-terephthalic acid, orthophthalic acid, trimesic acid, naphthoic, naphthalene dicarboxylic acids, and other aromatic carboxylic acids which are difficultly purifiable by conventional methods such as recrystallization and/or distillation. It may also be utilized for the removal of heavy metals from salicylic acid, especially from aqueous solutions of its sodium salt.

The crude terephthalic acid and isophthalic acid employed in Examples I to III are typical of these phthalic acid isomers when produced by the catalytic liquid phase air oxidation process and recovered from the reaction mixture by crystallization and especially by a subsequent water leaching of the originally crystallized phthalic acid product. Aromatic carboxylic acids containing greater amounts of metals, as high as 400 to 600 p.p.m. can be satisfactorily purified by the process of this invention.

What is claimed is:

1. The removal from an aromatic carboxylic acid selected from the class consisting of benzene and naphthalene mono-, di- and tri-carboxylic acids obtained by catalytic liquid phase oxidation in the presence of heavy metal oxidation catalysts, of heavy metals from said heavy metal oxidation catalyst which comprises forming an aqueous solution of an alkaline salt of said aromatic carboxylic acid, subjecting said solution to carbon monoxide at a pressure of from 1 to 1000 atmospheres of carbon monoxide at a temperature above 20° C. until said solution is water-white whereat a colored precipitate forms, removing the precipitate from the treated solution, and recovering the aromatic acid.

2. The process of claim 1 wherein said crude aromatic carboxylic acid is a benzene dicarboxylic acid.

3. The process of claim 1 wherein said crude aromatic carboxylic acid is a benzene tricarboxylic acid.

4. The process of claim 1 wherein the alkaline salt is the sodium salt.

5. The process of claim 1 wherein the alkaline salt is the potassium salt.

6. The process of claim 1 wherein the alkaline salt is the ammonium salt.

7. The removal from terephthalic acid obtained by catalytic liquid phase oxidation in the presence of heavy metal oxidation catalyst, of heavy metals from said heavy metal oxidation catalyst and 4-carboxybenzaldehyde which comprises treating an aqueous solution of a dialkaline terephthalate with carbon monoxide at a temperture in the range of 100 to 200° C. and at a carbon monoxide pressure of from 10 to 100 atmospheres until said solution is water-white, separating the resulting solution from the colored precipitate which forms, and recovering the terephthalic acid.

8. The process of claim 7 wherein the aqueous solution following treatment with carbon monoxide and removal of the colored precipitate is passed through a bed of activated carbon.

9. The process of claim 7 wherein the dialkaline terephthalate is disodium terephthalate.

10. The process of claim 7 wherein the dialkaline terephthalate is dipotassium terephthalate.

11. A process for decolorizing an aqueous solution of a water-soluble alkaline salt of a crude terephthalic acid which comprises subjecting said colored solution to carbon monoxide at a pressure of from 1 to 1000 atmospheres of carbon monoxide at a temperature in the range of from 20° to 200° C. until the solution is water-white whereby a colored precipitate forms and separating the colored precipitate from the decolorized aqueous solution.

References Cited in the file of this patent

UNITED STATES PATENTS

| | | |
|---|---|---|
| 2,154,626 | Koch | Apr. 18, 1939 |
| 2,744,938 | Urban | May 8, 1956 |
| 2,865,708 | Dinsmore et al. | Dec. 23, 1958 |
| 2,927,130 | Shutt | Mar. 1, 1960 |

FOREIGN PATENTS

| | | |
|---|---|---|
| 796,909 | Great Britain | May 17, 1957 |
| 777,782 | Great Britain | June 26, 1957 |
| 788,276 | Great Britain | Dec. 23, 1957 |

OTHER REFERENCES

Hieber et al.: Z. Anorg. Allgen. Chem. 240, 1939, 261–72.

Remy: Treatise on Inorganic Chemistry, vol. I, pages 444–6 (1956).

Mellor: Comp. Treatise on Inor. & Theor. Chem., vol. 5, page 957 (1924).